United States Patent [19]
Oliveros

[11] Patent Number: 5,682,151
[45] Date of Patent: *Oct. 28, 1997

[54] DATA INPUT DEVICE AND CORRELATIVE ENCODING TECHNIQUE

[76] Inventor: Ernesto Vidal Oliveros, 1329 Third Ave., Suite 392, Chula Vista, Calif. 91911

[*] Notice: The term of this patent shall not extend beyond the expiration date of Pat. No. 5,600,314.

[21] Appl. No.: 555,420

[22] Filed: Nov. 9, 1995

Related U.S. Application Data

[63] Continuation-in-part of Ser. No. 508,188, Jul. 27, 1995, Pat. No. 5,600,314.

[51] Int. Cl.$^6$ .................................................. G06F 13/00
[52] U.S. Cl. ...................... 341/23; 364/709.12; 364/189; 340/20
[58] Field of Search .................... 341/20, 23, 22; 340/711; 74/471 XY; 400/485, 98; 364/709.12, 189, 419.08

[56] References Cited

U.S. PATENT DOCUMENTS

| | | | |
|---|---|---|---|
| 4,215,343 | 7/1980 | Ejiri et al. | 340/711 |
| 4,442,506 | 4/1984 | Endfield | 364/419.08 |
| 4,456,972 | 6/1984 | Lee et al. | 364/419.08 |
| 4,464,070 | 8/1984 | Hanft et al. | 400/98 |
| 4,520,457 | 5/1985 | Hagler et al. | 364/419.08 |
| 4,680,577 | 7/1987 | Straayer | 340/711 |
| 4,799,144 | 1/1989 | Parruck et al. | 364/200 |
| 4,891,786 | 1/1990 | Goldwasser | 364/419.08 |
| 4,964,075 | 10/1990 | Shaver et al. | 364/419.08 |
| 5,086,503 | 2/1992 | Chung et al. | 395/700 |
| 5,121,472 | 6/1992 | Danish et al. | 395/275 |
| 5,167,017 | 11/1992 | Sasaki | 395/148 |
| 5,187,797 | 2/1993 | Nielsen et al. | 395/800 |
| 5,283,862 | 2/1994 | Lund | 395/155 |
| 5,305,449 | 4/1994 | Ulenas | 395/500 |
| 5,377,358 | 12/1994 | Nakamura | 395/800 |
| 5,521,596 | 5/1996 | Secker | 341/20 |

*Primary Examiner*—Jeffery Hofsass
*Assistant Examiner*—Albert K. Wong
*Attorney, Agent, or Firm*—Jones, Tullar & Cooper, P.C.

[57] ABSTRACT

A computer input device, i.e. a keyboard, employs a reduced number of keys for entering words, numbers and commands. A novel and economical data encoding technique is employed which assigns single four bit code words (known as cuytes) to the Arabic numerals 0-9, two cuytes to the letters of the alphabet, and three or more quytes to various "sipher" represented commands. This encoding technique not only decreases memory space requirements, but also increases processing speed. To enable an operator to select virtually any number of sipher represented commands, a plurality of additional function keys is provided, and these can be operated in a sequential manner along with the arrow, period and comma keys to generate a sipher represented command comprised of any number of cuytes. The end of a sipher command is signified by the actuation of a letter or numeral key. Each sipher can be represented by an icon which graphically combines all of the key symbols that are necessary to invoke it. A pair of key stick actuators is also provided on the keyboard, each of which combines the functions of a conventional key and a joy stick.

19 Claims, 7 Drawing Sheets

| Keys | | Conventional | Teen Numerals | | | | | | |
|---|---|---|---|---|---|---|---|---|---|
| ◁ | Left | Left | O | Off | 1O | Teen | 2O | Tweenty | |
| ▷ | Right | Space or Right | 1 | One | 11 | Onteen | QO | Queenty | |
| △ | Up | Up | 2 | Two | 12 | Secteen | Q1 | Queenty one | |
| ▽ | Down | Enter or Down | 3 | Three | 13 | Thirteen | QQ | Queenty cue | |
| ◯ | Ctrl | Ctrl or Escape | 4 | Four | 14 | Fourteen | KO | Kingty | |
| ◇ | Add | Insert | 5 | Five | 15 | Fifteen | KK | Kingty cay | |
| □ | SHFT | Shift | 6 | Six | 16 | Sixteen | 1OO | Hund | |
| ◉ | Clr | Delete | 7 | Seven | 17 | Seventeen | : | Hunds | |
| ◠ | Alt | Alt or mouse | 8 | Eight | 18 | Eighteen | 1OOO | Thou | |
| ⇗ | Caps | Caps Lock | 9 | Nine | 19 | Nineteen | " | Thous | |
| ⌐ | Tab | Tab | Q | Cue | 1Q | Cueteen | C | Key | |
| ҫ | Infer-Tel-Calc | | K | Cay | 1K | Cayteen | ' | Key | |

| Secteens | | | | | |
|---|---|---|---|---|---|
| a | al | ! | On | n | nel |
| b | bel | ? | Sec | o | ol |
| c | cel | \ | Thirt | p | pel |
| d | del | ⌐ | Fort | r | rel |
| e | eal | $ | Fift | s | sel |
| f | fel | ) | Sict | t | tel |
| g | gel | ⌐ | Sept | u | ul |
| h | hil | & | Oct | v | veal |
| i | il | @ | Novt | w | wel |
| j | jeal | q | Cute | x | xel |
| l | leal | k | Cayte | y | yel |
| m | meal | φ | Teen | z | zeal |

FIG. 3

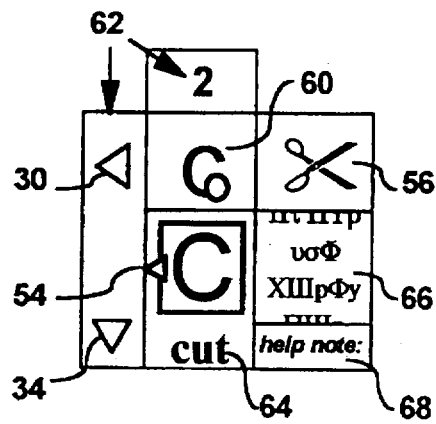
FIG. 8
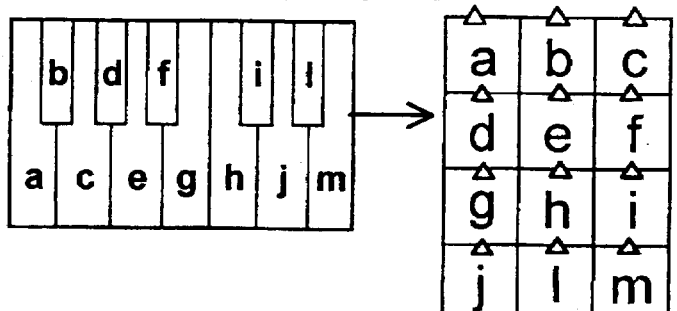
FIG. 9
FIG. 10a
FIG. 10b

FIG. 11

DATA INPUT DEVICE AND CORRELATIVE ENCODING TECHNIQUE

CROSS REFERENCE TO RELATED APPLICATIONS

This is a continuation-in-part of application Ser. No. 08/508,188, filed Jul. 27, 1995, now issued as U.S. Pat. No. 5,600,314.

BACKGROUND OF THE INVENTION

The present invention relates in general to a data input device, i.e. a keyboard, and a method for encoding data entered through the keyboard.

Keyboards have been employed for many years as data entry devices for computers and the like. Data encoding techniques have also been employed for many years, with the most popular being the American Standard Code for Information Interchange, otherwise known as ASCII, which was created in 1968 on the basis of a keyboard used on a key-punched card mainframe computer. This code is based on eight binary digit representations of the various characters that can be entered on a conventional keyboard.

In recent years, emphasis has been placed on making computers both smaller and user friendly. In an effort to manufacture portable computers, vendors have marketed lap top computers which can be stored in a briefcase, and which employ conventional keyboards that are smaller than normal. Unfortunately, these keyboards are difficult to operate due to the size of their keys.

Almost 300 years ago the piano was invented, and it became the standard musical keyboard. Today's computer keyboard is challenging the piano in playing music, however this input device is far from being adapted to perform such a function. The standard piano is based on a diatonic scale consisting of 12 notes each octave. In addition, there have been some attempts at switching to a duodecimal (base 12) system in order to tie the conventional time system based on 12 hours to the English measurement system. Nevertheless the world is still divided into two measurement standards: the Metric system and the English system.

Although numerous efforts have been made to alter the number, arrangement and functions of the keys on a keyboard, none of these attempts appear to have been commercially successful, and the conventional "QWERTY" keyboard remains the standard in the industry. Similarly, the ASCII code remains the industry standard, in spite of the fact that it is not a particular efficient code.

SUMMARY OF THE INVENTION

To address the foregoing problems, it is the object of the present invention to provide an improved data input device and an associated data encoding technique which combine to provide a device that is considerably easier and more efficient to use than conventional input devices. More particularly the present invention provides a keyboard type input device which employs a minimum number of keys, a novel key and joy stick arrangement, and a corresponding coding technique which permit an operator to select many different functions in an easy and efficient manner.

The keyboard is comprised of 45 keys that are separated into three groups. The first group of 12 keys is centrally located on the keyboard and is assigned to the numerals 0–9, and letters Q and K. A second group of 24 keys are assigned to the remaining letters of the English Alphabet and this group is separated into two sections on either side of the first group. Finally a third group of nine keys located at the bottom of the keyboard, include the four arrows, period (or decimal point), comma, SHFT, ADD and CLR keys. Such an arrangement facilitates the use of a decimal (base 10) system (numerals 0 through 9) or a duodecimal (base 12) system (numerals 0 through K).

In addition, two joy stick type input devices known as key sticks are positioned near the bottom of the keyboard for the actuation by an operator's thumbs. The key sticks are specially designed so that they can be actuated in a directional manner for browsing, pointing, selecting, scrolling and other functions, and can also be pressed to provide the CTRL and ALT key functions.

The keyboard is designed to be used with a novel digital encoding technique that is based on a four bit word length, and provides a more efficient coding method than does the conventional ASCII system. With this technique numerals are defined by a single four bit digital code word known as a cuyte, letters of the alphabet of the alphabet are defined by a pair of four bit code words or cuytes, and special symbols or commands are defined by three or more cuytes. It is particularly advantageous that the coding assignments for each of the keys are selected so that each of the Arabic numerals 0–9, and letters Q and K are represented by one cuyte because this enables the microprocessor to process numbers more quickly and reduces by half the amount of memory storage space required to store numbers. The four arrows are also represented by a single cuyte. However, the remaining letters of the alphabet are represented by two cuytes. The SHFT, ADD, CLR, period and comma key symbols are each defined by three cuytes.

Any number of specific computer commands known as "siphers" can be defined by three or more cuytes through sequential actuation of two or more of the keys. Each of the multiple cuyte codes defining these commands begins with a cuyte corresponding to one of the four arrow symbols, and ends with a cuyte code corresponding to a numeral (0–9) or a letter Q or K. Between them, any combination of cuytes corresponding to the four arrow keys, can be inserted to define a command code of any desired length. Frequently used commands can be graphically represented by "key strings" which provide a convenient means for indicating the identity and sequence of keys necessary to invoke each command through the proper sequential keystroke actuation.

The keyboard can be operated in a number of distinct modes. The first is the conventional typing or editing mode in which an operator actuates the keys for typing words and numbers and editing text. The second mode is a digital encoding mode in which the operator can form digital source code for a program simply by entering the appropiate groups of the cuytes assigned to each keys. A third mode is known as the programming mode in which the operator can write a computer language program by typing sequences of any number of siphers. The fourth mode is the analog encoding mode in which the operator can develop analog source code by entering the musical tones assigned to each key. Such a technique is based on the diatonic musical scale of a piano where each of the 26 letters of the English alphabet and the 10 Arabic numerals are assigned to arrays of keys of 4 rows by 3 columns known as "teeners".

BRIEF DESCRIPTION OF THE DRAWINGS

The features and advantages of the present invention will become apparent from the following detailed description of a preferred embodiment thereof, taken in conjunction with the accompanying drawings, in which:

FIG. 3 is a chart illustrating the names of a number of the keys on the keyboard of FIG. 1 and their equivalence to a conventional IBM-PC keyboard;

FIG. 8 illustrates the method for enciphering a symbol;

FIG. 9 illustrates 3-stroke key strings;

FIG. 10 illustrates how a piano's octave is transformed into a teener;

FIG. 11 is a coding map for each of the keys defined with three cuytes;

DETAILED DESCRIPTION OF THE PREFERRED EMBODIMENTS

Figure 1:
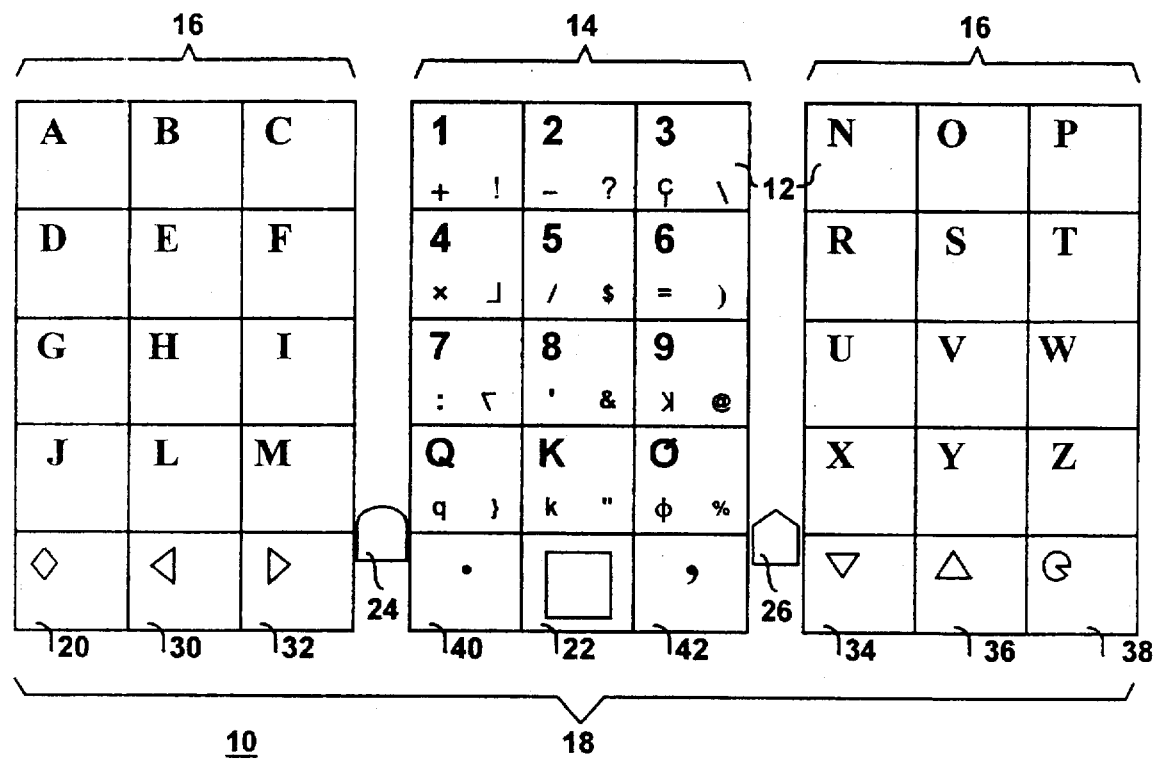
FIG. 1 is a diagrammatic illustration of a keyboard type input device constructed in accordance with a preferred embodiment of the present invention.

Turning now to a detailed consideration of the preferred embodiment of the present invention, FIG. 1 illustrates a portable keyboard input device 10 which is comprised of a group of 45 conventional keys 12. The keys 12 are separated into three distinct groups. A first group 14 of keys is centrally located on the keyboard, and includes the 10 Arabic numerals 0–9, and the letters Q and K. A second group of keys illustrated at 16 is assigned to the remaining 24 letters of the alphabet. This group of keys is actually separated into left and a right section which are disposed on either side of the number key group 14 to provide a comfortable spacing for an operator's left and right hands. The reason for separating the letter group is because human-type of hands collide when trying to type closely together.

Finally, A third group 18 of nine keys is located at the bottom row of the keyboard 10 which include the left arrow 30, right arrow 32, down arrow 34, right arrow 36, point (period) 40, comma 42, ADD 20, SHFT 22 and CLR 38 keys. The right arrow key 32 replaces the function performed by the space bar in a conventional keyboard in addition to placing the cursor one place to the right. The down arrow key 34 replaces the function of the conventional ENTER key which is employed for the "carriage return" function performed by conventional typewriters. In addition, the down arrow key 34 is able to position the cursor one row bellow. As illustrated in FIG. 1 these two keys are well positioned for the comfortable operation of the user's thumbs.

The input device 10 also includes two joy stick type actuators 24 and 26, known as key sticks, which are positioned at a suitable location near the bottom of the keyboard 10 so that each of them can be easily actuated by a corresponding one of an operator, s thumbs. The key sticks 24 and 26 are so named because they can be used both as conventional keys, as well as directional actuators. When employed as conventional keys, the two key sticks 24 and 26 provide the CRTL and ALT functions respectively.

Figure 2:
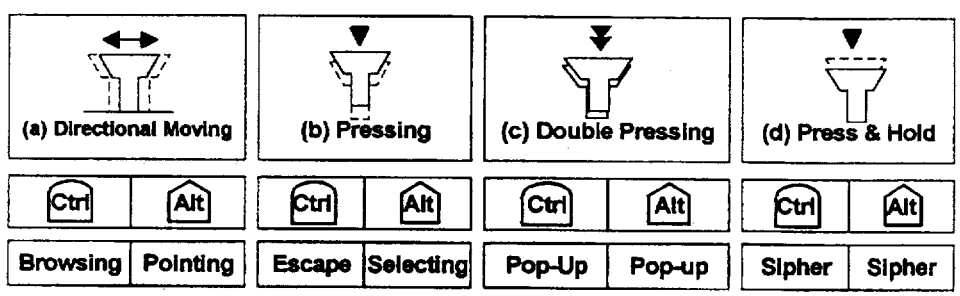
FIG. 2 is a table illustrating the operations than can be carried out by the key stick devices of the preferred embodiment.

The operation of the CTRL and ALT key sticks 24 and 26 is illustrated in FIG. 2. The four possible input modes are labeled (a)–(d), and include directional moving, pressing, double pressing and press and hold. In a editing and typing mode the four modes of the CTRL key stick 24 correspond to browsing, escape, pop-up menu displaying and sipher invoking. The same modes for the ALT key stick 26 correspond to pointing, selecting, pop-up menu displaying and sipher invoking. These functional assignments are made to provide the operator the most convenient operation. For example the operator can browse a document with the directional moving of the CTRL key stick 24, and at the same time, point to a particular part of the document with the directional moving of the ALT key stick 26. This greatly simplifies the browsing function which, in conventional operating systems, is normally implemented using multiple point and click operations on bi-directional scrolling bars.

The key sticks 24 and 26 can also be employed in a game mode in which they are used in much the same manner as conventional joy sticks, however, also include the ability to hit, throw, shoot, etc. by pressing down on them. The key sticks 24 and 26 are advantageous in this regard since they do not need to be made much larger physically than the rest of the keys on the keyboard 10 and thereby assist in minimizing the overall size of the keyboard 10.

The 45 key encoding device 10 is designed with economy, portability as well as ease of use in mind, and uses a minimum number of keys to minimize the overall size of the keyboard, without minimizing the size of the individual keys. FIG. 3 illustrates the names and functions of various keys and the key sticks 24 and 26. It should be noted that although the keyboard 10 has only 45 keys, it can be employed to select any functions carried out by conventional IBM-PC Keyboard.

It has been discussed for years what would be the best "numerical base" to suite today's technological needs; in the computer science a hexadecimal system has been proven useful. This hexadecimal procedure is the result of combining binary quantities of 1's and 0's in sets of 4 bits. The present invention proposes a duocecimal system, based on the "vectorial theory" which claims that the first 12 elements of an array of 16 should be assigned to magnitude quantities and the remaining 4, should be used as directional values. With this array, letters Q and K are assigned to the first group 14 of the encoding device 10 facilitating a dual numeric system which enables the operator to use either the conventional decimal system or the duodecimal numeric system known as the "teen system". With such an arrangement the user can easily relate the Babylonian time system (two dozen hours make a day) with the English spatial system (a dozen inches make a foot), with the Gregorian Calendar (a dozen months make a year), and with the diatonic scale of a piano (a dozen tones make an octave). In this particular arrangement the number zero is substituted for the number "Off"written as "Ó", that is a "O" with an acute accent. FIG. 3 illustrates the names for such a system where the number 1Ó represents the decimal number 12 and it is called "teen" instead of "ten". The letters Q and K correspond to the decimal numbers 10 and 11 correspondingly. It should be noted that the proposed duodecimal system greatly enhances any operation to be performed. For example, suppose a user can dial up to 100 numbers with a conventional telephone, with a duodecimal-based telephone system the operator could dial up to 144 numbers (12 times 12), hence expanding by 44% the availability of telephone numbers to be dialed.

Figure 4:
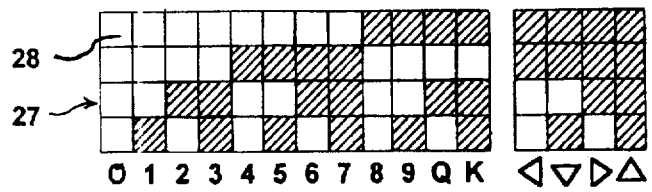
FIG. 4 is a coding map for each of the keys in the first group of keys on the keyboard of FIG. 1.

FIG. 4 is a coding map for each of the keys in the first group 14, including the teen numerals Ó-K and also for the each of the four arrow keys 30, 32, 34 and 36. As illustrated each of these 16 keys are identified by a unique four bit binary code word 27 known as a "cuyte". FIG. 4 illustrates the cuyte coding system for the 16 keys as a graphic representation in which each bit of each cuyte is depicted either by a filled (shaded) box which represents a binary 1, or an empty (unshaded) box which represents a binary 0. As illustrated each cuyte 27 is represented by four squares 28 arranged in a vertical stack from bottom to top. The symbol corresponding to each of the cuytes 27 is printed below the corresponding cuyte code representation. The use of single cuytes for each of the numeral keys is particular advantageous and economical because numbers can be represented by half the number of binary digits required in the conventional ASCII code, thus reducing memory storage space and processor execution time. As in a conventional keyboard each of the keys in the number group 14 can also generate other symbols, such as + and − sings, by pressing the SHFT key 22.

Figure 5:
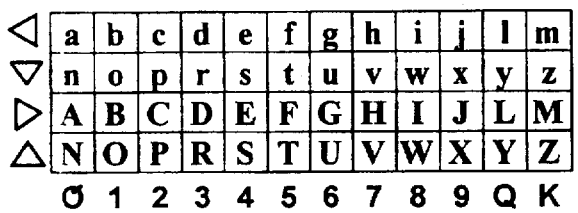
FIG. 5 is a coding map for each of the keys in the second group of keys on the keyboard of FIG. 1.

FIG. 5 illustrates a coding map for each of the keys in the letter group 16. Each is represented by two cuytes, the first of which is an arrow cuyte and the second of which is one of the cuytes corresponding to the teen numerals Ó-K. For example, the upper case "A" is represented by the "right arrow" followed by the numeral "off", while the lower case "a" is represented by the "left arrow" followed by the numeral "off". As it can be concluded, thanks to the vectorial theory, letters can be built from a sequence of a dozen of teen numerals in conjunction with the four arrow keys.

Figure 6:
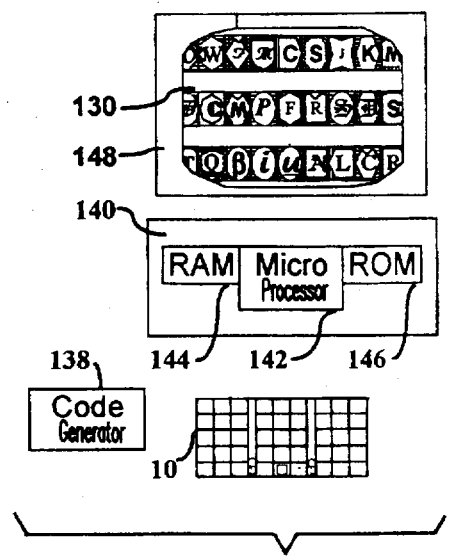
FIG. 6 is a block diagram of a computer system employing the keyboard input device of FIG. 1.

Turning now to FIG. 6, a software or hardware based code generator 138 is formed integrally with the keyboard 10 which generates the cuytes each time one of the keys 12 is pressed. It should be understood that the code generator 138 differs from a conventional ASCII based device only in the four bit encoding scheme as discussed previously in conjunction with FIGS. 4 and 5. The keyboard 10 is connected to a conventional computer system 140 containing a microprocessor 142, a RAM 144 and a ROM 146. As is also conventional, a video display or monitor 140 is also connected to the computer system 140. A decoder program is stored in the RAM 144 and is executed by the microprocessor 142 which stacks and processes the incoming cuytes received from the keyboard code generator 138.

Figure 7:
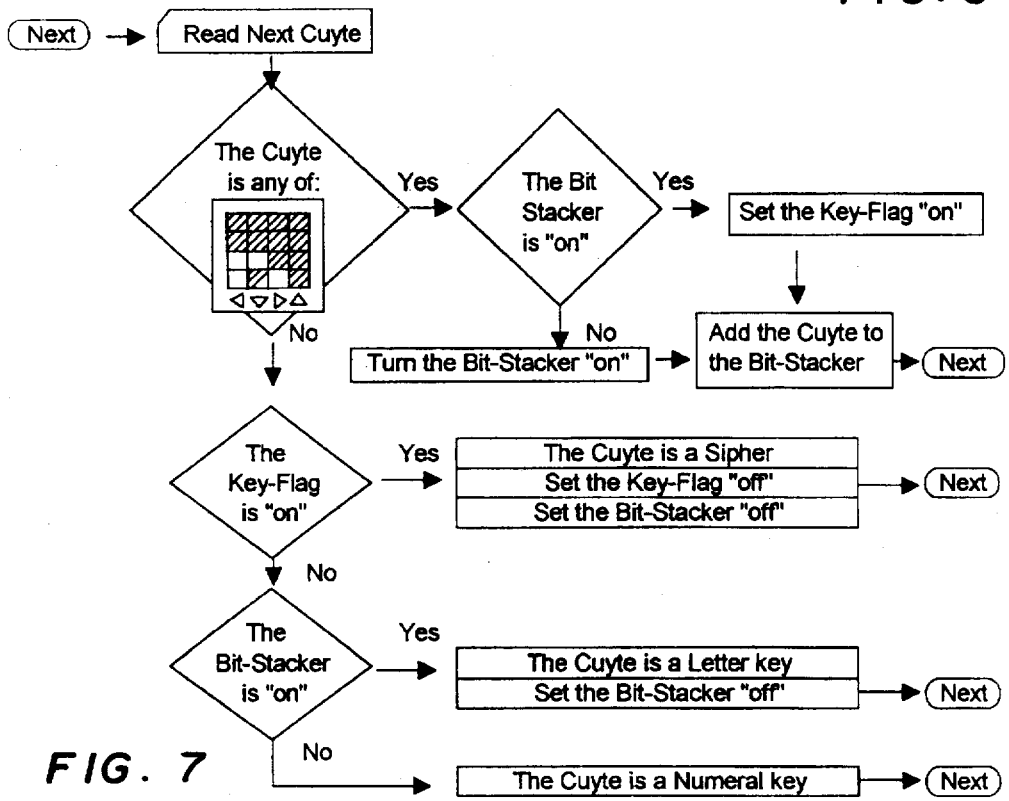
FIG. 7 is a flow chart illustrating the operation of decoder software program for use with the digital encoding technique that is employed with the preferred embodiment of the present invention.

The flow chart illustrated in FIG. 7 shows how the digital decoder program functions when the microprocessor reads information encoded in a cuyte coding form. The program distinguishes between a one cuyte numeral code, a two cuyte letter code, and a three or more cuyte "sipher" code. In addition, the decoder program employs a sipher flag and a bit stacker flag to differentiatiate between numbers, letters and multiple cuyte sipher codes.

FIG. 8 illustrates a "sipher" 60, which is a symbol that represents a computer language command which can be formed and later invoked through sequential actuation of a plurality of keys 12 of the keyboard 10. As illustrated in FIG. 8 a sipher 60 is assigned with a particular cuyte-address 62, a speech recognition name 64, a computer language digital code 66, a help note 68, an Icon 56, and a keystroke sequence know as key string 54. This procedure is known as "enciphering" a symbol.

The representation of a sipher in the foregoing manner provides a very economical and convenient way in which to represent a computer language command because it only occupies the space needed for representing one character. In addition, many commonly used programming commands can be implemented using this system with considerably fewer bits than those required using conventional ASCII code. For example, the command "cut" enciphered in FIG. 8 is represented by 24 bits (three characters times eight bits per character) in the conventional ASCII code, but with the cuyte coding technique, it can be addressed by as few as 12 bits (e.g., one cuyte for the left arrow 30, one cuyte for the down arrow 34, and finally one cuyte for the numeral "2").

Key strings 54 are graphical representations that describe the sequence of keys 12 necessary to invoke a particular sipher 60. They can be only started with one of the three "base keys", the SHFT key 22, the CTRL 24 or ALT 26 key sticks. FIG. 9 illustrates key strings 54 that can be assembled with one of the base keys in conjunction with any of the keys located at the bottom row 18 of the input device 10 in addition to a letter or numeral key. In the example depicted in FIG. 8 the operator types the key string "C-west" by pressing and holding the SHFT 22, left-arrow 30, and letter "C" keys in sequence. When the user releases the aforementioned keys, the sipher "cut" is invoked. This is known as "typing C-west". It should be pointed out, that the chart in FIG. 9 only illustrates two dozen available key strings 54 that can be assembled with a 3-stroke sequence, however key strings can be assembled through sequential actuations of as many keystrokes as the operator may wish. A plurality of key strings 54 could be built with this method. For example, "E5-north" is assembled while pressing and holding the SHFT 22, up-arrow 36, letter "E" and numeral "5" keys in sequence; when those keys are released a particular sipher is invoked. Another way of looking at the enciphering device 10 is as a set of three key matrixes with 4 rows by 3 columns (known as "teeners" 70) which generate symbols that in conjunction with the keys at the bottom row 18 produce more symbols which represent computer language commands or siphers 60.

Figure 11:
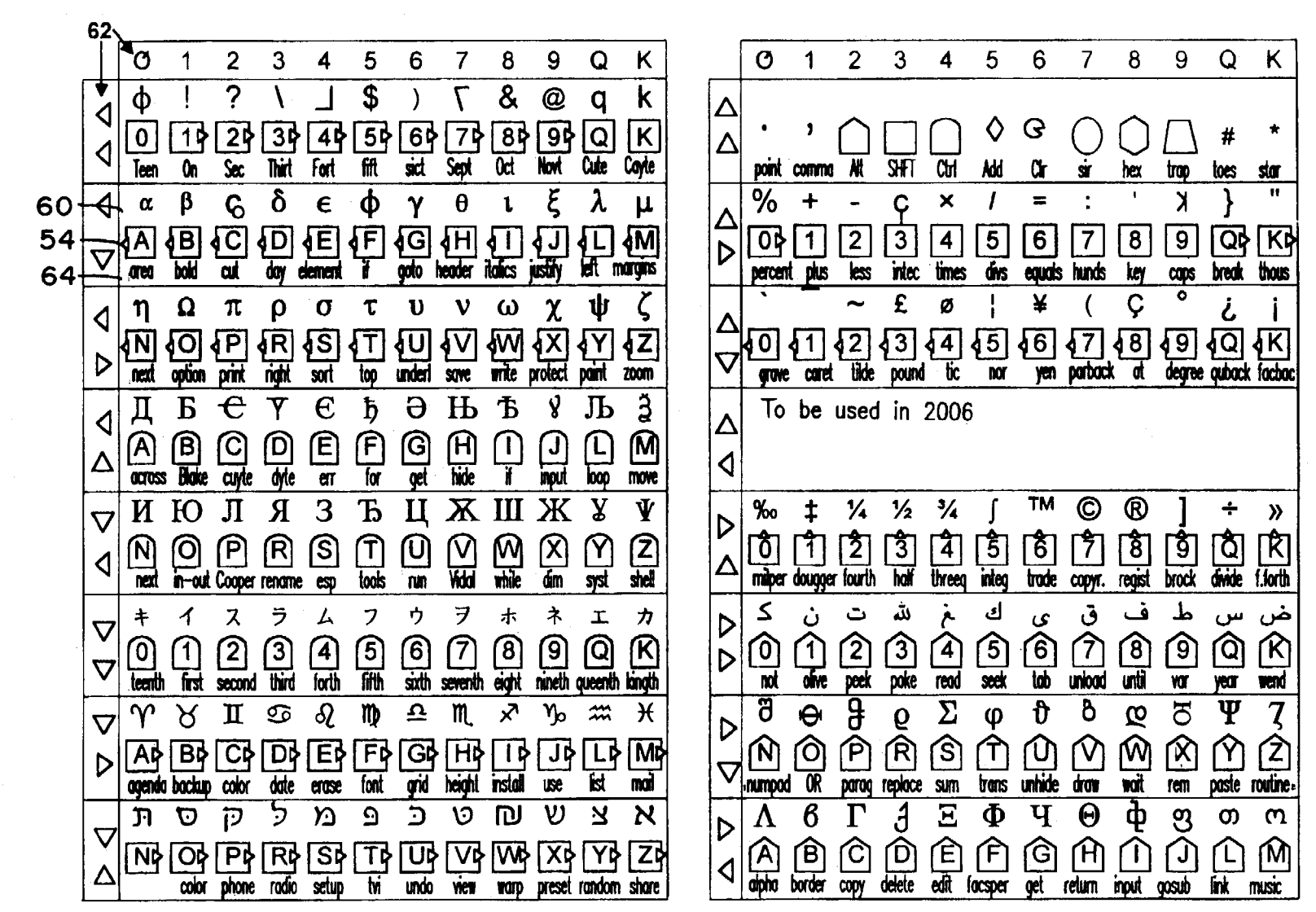

FIG. 11 is a coding map for each of the siphers defined with 3-cuyte addresses such as the point (period) 40, comma 42, ADD 20, SHFT 22, or CLR 38 keys and some other siphers; there are 192 available combinations (16 times 12). FIG. 11 illustrates siphers 60 which have memory addresses 62 defined by the sequence formed by two cuytes corresponding to the arrow keys and one cuyte corresponding to the teen numerals Ó-K. Bellow each sipher 60 there is a key string 54 and a speech recognition name 64 called "spin" which enables an operator to invoke the command simply by speaking the corresponding words. A similar coding map could be built for siphers with 4-cuyte addresses, such a map would consist of 3,072 (16 times 192) available memory directions. As illustrated in FIG. 11 the present invention "enciphers" Greek, Cyrillic, Hebrew, Arab & Chinese symbols. These siphers are the foundation of a proposed language to be used in the World Wide Web called "Hylang", this language is not only an enciphered programming language but also an English-based spoken language where the letter "C" (pronounced "Key") has a strong sound and the letter "S" a soft sound, given the facts that Q & K are letters no more.

The keyboard 10 can be operated in various modes. An information organizer mode selected by typing I-north, causes the input device 10 to be operated in a conventional manner for generating information, and for editing the same. In a programming mode, invoked by typing P-sun, the keyboard 10 can be utilized by the operator for typing siphers 60 in accordance with the foregoing discussion. In a digital source code mode, which can be invoked by typing D-south, the keyboard 10 is utilized by the operator for entering digital source code directly into the memory by pressing the appropriate keys for generating an arrangement of cuytes which are sequentially stacked by the decoder program. Typing O-Shft toggles from the decimal system to the teen system and when one sequentially types 3-Shft, the input device 10 switches from the conventional mode to a telephone mode to a calculator mode.

In addition, in an analog source code mode, invoked by typing E-sun the keyboard 10 is employed for encoding analog musical tones. This proves to be very helpful for sending information in FM analog form through electrical wiring. General Electric just released to the market the "Wireless Phone Jack". It converts a phone signal into a FM signal and then broadcast it over existing electrical wiring, turning any electrical outlet into a phone jack. This engineering breakthrough is the foundation of an electrical network known as "Electriweb" where data can be transported through electrical wiring in an analog FM code form.

Figure 12:
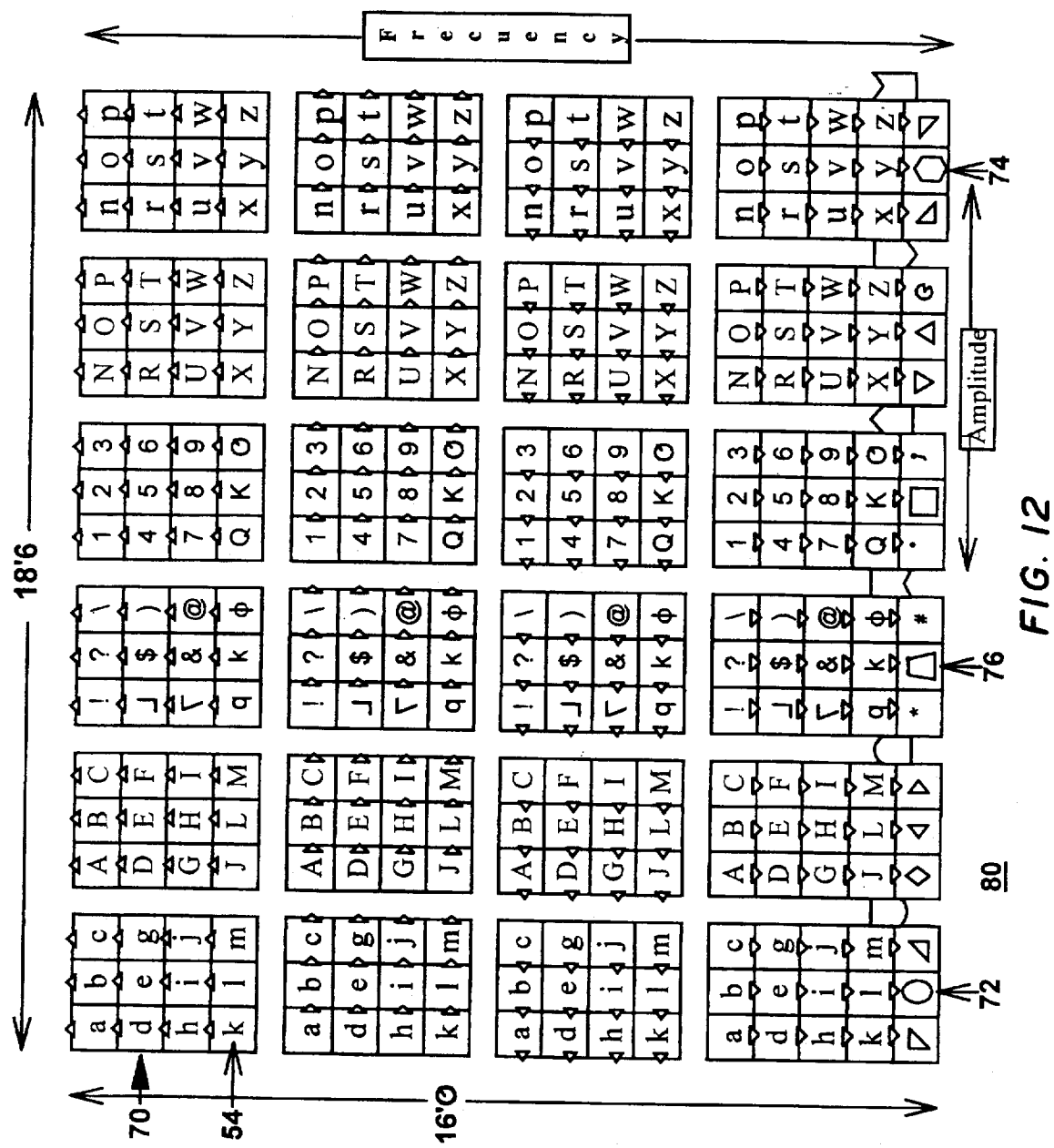
FIG. 12 is a diagrammatic illustration of the analog encoding technique for the present invention where each of the keys of the first and second groups have a corresponding key on a conventional piano keyboard.

FIG. 10a illustrates a piano's "octave" comprised of 12 keys and transformed into a teener 70 illustrated in FIG. 10b also comprised of 12 keys. FIG. 12 is a diagrammatic illustration of the analog encoding technique for the present invention where each of the numeral and letter keys of the first group 14 and second group 16 have a corresponding key on a conventional piano keyboard. Thus, the present invention provides a new option for a musical keyboard where "octaves" are rearranged as a variety of teeners 70. The space existing among teeners 70 gives the operator a quick visual differentiation among every key. In addition, the user can easily memorize the position of every alphanumeric key. In this way, the input device 10 encodes letters and numerals in musical form, converts them into analog FM signals and broadcast them over electrical wiring. This is particularly economical given the fact that, the electrical power source becomes at the same time an analog source for transmitting information.

FIG. 12 also illustrates how key strings 54 become very usefull not only as graphical means for describing the particular sequence of keys 12 to actuate in the input device 10 but also as means for describing a position of those particular key strings 54 in the musical keyboard 80. In this way, the key strings 54 are not only keystroke sequence descriptions but also a musical notation procedure for the input device 80. The Hylang/teen system is provided with four dozen letters and two dozen single numerals. With such a system the encoding device 10 can be easily "unfolded" into a more powerfull programming device 80 which not only can be used as a musical keyboard but also as a computer software developing device. The teen board 80 is expandable and it can be attached to additional input devices syncronized in different modes. As illustrated in FIG. 12, in addition to the SHFT 22 mode, the input device 80 can be used in the sir mode by actuating the circle key 72, hex mode by actuating the hex key 74, and the trap mode by pressing the trap key 76. The input device 80 is also furnished with 6 key stick type of actuators.

Figure 13C:
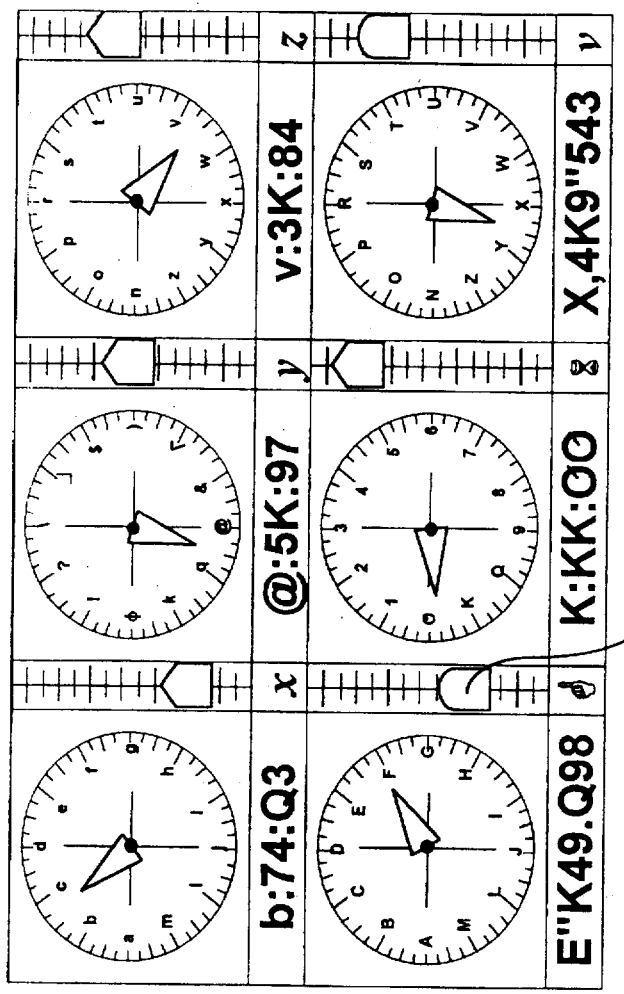
FIGS. 13a–c illustrate the construction and application of an analog measurement device known as a teenzer.
Figure 13A:
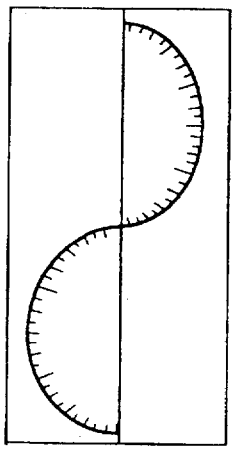
Figure 13B:
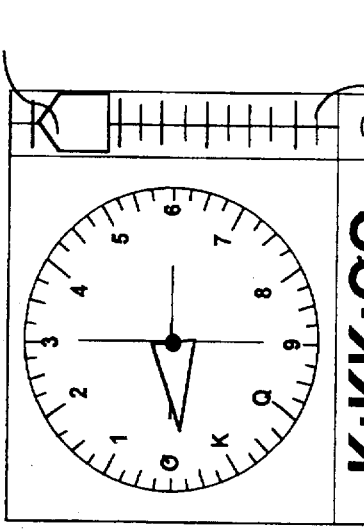
Figure 14:
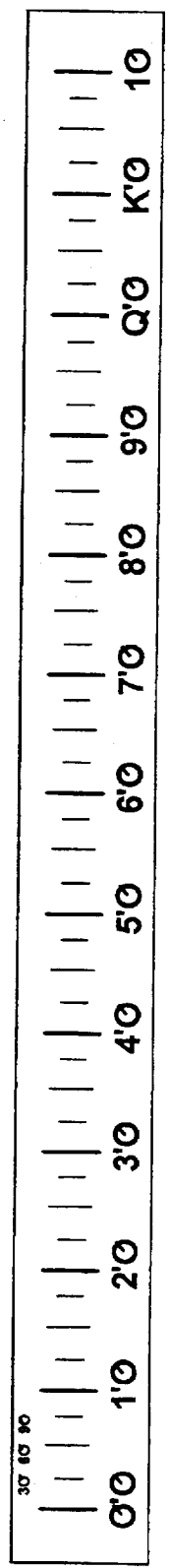
FIG. 14 illustrates a teen ruler.

It should be pointed out that the proposed duodecimal system is very functional in many respects. FIG. 13a shows a sine wave divided into 12 sectors which is transformed into a analog "teenzer" 92 illustrated in FIG. 13b that is conveniently divided into a dozen "chrons". A chron is divided into a dozen onchrons, each onchron is divided into a dozen sechrons and so on. A teenzer 92 then, can be used as a clock describing the position of the sun at a particular chron of the day. As an example sunrise is at 0 chrons, noon at 3 chrons, sunset at 6 chrons and midnight at 9 chrons. A teenzer 92 is also equipped with a digital screen, in the example depicted in FIG. 13b a time of "teen sechrons to sunrise" is displayed. As illustated in FIG. 13c, a half dozen type of teenzers 92 can be invoked when a key stick 24 or 26 of the input device 10 is pressed and held in conjunction with a letter or numeral key. A teenzer 92 then, is a multipurpose device equipped with an analog as well as a digital means for scaling a particular measurement through a key stick. It is particular adventageous that a teenzer 92 does not use negative values to describe a particular point in the lower part of a sine wave. FIG. 13c illustrates a device able to describe the geographical direction of a flying object in "vectors" in addition to the time, velocity and fuel capacity. FIG. 14 illustrates the teen ruler where a dozen keys (18 mm) make a the top of a page (8½"). As an example the top margin of a credit card equals 3 keys (written 3'O) the teen ruler then, becomes very handy given the fact that it associates three of the most used items in the information era: a key, a credit card and a page. Such a ruler is based on a unit of lenght used by ancient Greeks, Hebrews, Egyptians and Romans, where 1 "digit" was equivalent to 18.50 millimeters and 12 digits made 1 "span".

In summary, the present invention provides a keyboard type input device and encoding technique therefore which provide numerous advantages over conventional input devices and encoding techniques. The overall arrangement of the keys and the key sticks results in an economical device which can be made easily portable, without sacrificing individual key size, while the cuyte based data encoding technique provides a versatile scheme which can increase processing speed and decrease memory space requirements. The invention also provides a convenient technique for enciphering commands, which is economical, easy to use and easy to understand. A novel duodecimal system is proposed which greatly enhances the possibilities over the conventional numerical system presently used.

Although the present invention has been disclosed in terms of preferred embodiment, it will be understood that numerous other modifications and variations could be made thereto without departing from the scope of the inventions as defined in the following claims.

What is claimed is:

1. A data input device comprising:
   a keyboard comprising a plurality of keys including a first group of keys assigned to letters of the alphabet and a second group of keys assigned to numerals; and
   a code generator for generating a plurality of four bit code words in response to actuation of said keys, one four bit code word for each of second group of keys, and two four bit code words for each of said first group of keys.

2. The data input device of claim 1, further comprising first and second key stick actuating devices, each of said key stick actuating devices including a directional actuator element which can also be pressed to act as a conventional key actuator.

3. The data input device of claim 2, wherein said first key stick actuating device provides a browsing function, and said second key stick actuating device provides a pointing function.

4. The data input device of claim 1, wherein said first group of keys is separated into first and second sections disposed on opposite sides of said second group of keys.

5. The data input device of claim 1, wherein said second group of keys further includes first and second letter keys.

6. The data input device of claim 1, further comprising a third group of keys for entering special functions.

7. The data input device of claim 6, wherein said third group of keys is positioned along a bottom row of said keyboard and consists of nine keys.

8. The data input device of claim 7, wherein said third group of keys correspond to four arrow keys and five command keys.

9. The data input device of claim 8, wherein said code generator generates a four bit code word in response to actuation of one of said four arrow keys, and three four bit code words in response to actuation of one of said command keys.

10. A method for encoding digital data for entry into a computer comprising the steps of:
 a) providing a keyboard data entry device, said keyboard including a first group of keys corresponding to numerals, and a second group of keys corresponding to letters of the alphabet;
 b) providing a code generator connected to said keyboard for generating binary code words in response to actuation of the keys on said keyboard, said code generator generating a first plurality of four bit binary code words, one for each of said first group of keys, and generating a second plurality of pairs of four bit code words, one pair for each of said second group of keys.

11. The method of claim 10, further comprising the steps of:
 (c) providing a third group of command keys on said keyboard for invoking computer commands, each of said keys in said third group being assigned to a different group of three four bit code words; and
 (d) sequentially actuating a combination of said command keys to generate a variable length key string for invoking a computer command, said key string comprised of a plurality of four bit code words corresponding to said command keys, and terminating said key string by actuating any key in said first or second groups of keys.

12. The method of claim 11, further comprising the step of providing a graphical representation of a computer command, said graphical representation illustrating the sequence of keys on the keyboard which must be actuated to generate said command code.

13. A data input device comprising:
 a keyboard containing a plurality of keys for entering alphanumeric data, said keyboard including left, center and right sections of keys;
 a first key stick actuator positioned adjacent a bottom portion of said keyboard between said left and center sections for actuation by a operator's left hand thumb, said first key stick actuator including a directional actuator element which can also be pressed to act as a conventional key actuator; and
 a second key stick actuator positioned adjacent a bottom portion of said keyboard between said center and right sections for actuation by an operator's right hand thumb, said second key stick actuator including a directional actuator which can also be pressed as a conventional key actuator.

14. The data input device of claim 13, wherein said left and right sections contain letter keys and said center section contains numeral keys.

15. The data input device of claim 14, wherein said center section further includes first and second letter keys.

16. The data input device of claim 13, wherein said first key stick actuator provides a browsing function and said second key stick actuator provides a pointing function.

17. The data input device of claim 13, wherein said plurality of keys further includes a group of keys for entering special functions.

18. The data input device of claim 17, wherein said group of keys is positioned along a bottom row of said keyboard and consists of nine keys.

19. The data input device of claim 18, wherein said group of keys corresponds to four arrow keys and five command keys.

* * * * *